(12) United States Patent
Ariyoshi

(10) Patent No.: US 7,251,995 B2
(45) Date of Patent: Aug. 7, 2007

(54) FLUID FLOW SENSOR

(75) Inventor: Hiromi Ariyoshi, Kariya (JP)

(73) Assignee: DENSO CORPORATION, Kariya (JP)

( * ) Notice: Subject to any disclaimer, the term of this patent is extended or adjusted under 35 U.S.C. 154(b) by 25 days.

(21) Appl. No.: 11/332,352

(22) Filed: Jan. 17, 2006

(65) Prior Publication Data
US 2006/0156807 A1 Jul. 20, 2006

(30) Foreign Application Priority Data
Jan. 19, 2005 (JP) ............... 2005-011940

(51) Int. Cl.
G01F 1/68 (2006.01)
(52) U.S. Cl. ................ 73/204.15; 73/204.26
(58) Field of Classification Search ............ None
See application file for complete search history.

(56) References Cited

U.S. PATENT DOCUMENTS

| 4,080,821 A | * | 3/1978 | Johnston | 73/25.03 |
| 4,343,183 A | * | 8/1982 | Plapp | 73/204.15 |
| 5,069,066 A | * | 12/1991 | Djorup | 73/204.15 |
| 6,047,597 A | * | 4/2000 | Kleinhans | 73/204.15 |
| 6,981,411 B2 | * | 1/2006 | Konzelmann et al. | 73/204.26 |
| 2004/0211253 A1 | * | 10/2004 | Horie et al. | 73/204.15 |

FOREIGN PATENT DOCUMENTS

| JP | A-1-185416 | 2/1996 |
| JP | A-8-29228 | 2/1996 |
| JP | A-8-43162 | 2/1996 |

* cited by examiner

Primary Examiner—Harshad Patel
(74) Attorney, Agent, or Firm—Posz Law Group, PLC

(57) ABSTRACT

Two heat generating resistors are formed on a substrate in the upstream side with respect to an air flow direction and two other heat generating resistors are formed in the downstream side. A thermometer resistor for detecting a temperature in the intake manifold is formed on the substrate. A bridge circuit is formed of the heat generating resistors. A temperature of the four heat generating resistors is controlled to be at a predetermined temperature by balancing a bridge circuit constituted of the thermometer resistor or the like with a differential amplifier and a transistor. When air flows, electric potentials of the intermediate terminals in the bridge circuit change. A flow quantity and a flow direction of the air are calculated by detecting the electric potential difference.

7 Claims, 3 Drawing Sheets

FLUID FLOW SENSOR

CROSS REFERENCE TO RELATED APPLICATION

This application is based on and incorporates herein by reference Japanese Patent Application No. 2005-11940 filed on Jan. 19, 2005.

FIELD OF THE INVENTION

The present invention relates to a fluid flow sensor, for example, used for detecting an intake air quantity in an engine for an automobile.

BACKGROUND OF THE INVENTION

A mixture of air and fuel is burned in an engine combustion chamber for producing power of an automobile. Herein controlling a ratio of air and fuel (air-fuel ratio) is an important factor for appropriately driving the automobile in accordance with conditions thereof. Inappropriate control of this air-fuel ratio causes deterioration of fuel economy and increase of exhaust gases. In addition, knocking possibly occurs due to abnormal combustion of a mixture. Therefore, a flow sensor is generally disposed in an intake manifold of an engine for detecting a flow quantity of air, thus determining an injection quantity of fuel in accordance with the detected intake air quantity. That is, an air-fuel ratio of a mixture introduced into an engine combustion chamber is controlled.

Air flowing in the intake manifold is supposed to flow in one direction under normal conditions. However, as an engine rotational speed rises from a low speed region to an intermediate region to increase an intake air quantity and an exhaust gas quantity, opening/closing of an intake valve and an exhaust valve overlaps, possibly blowing a part of the exhaust gas back into the intake manifold. As a result, this causes a possible reverse flow of the air in the intake manifold. On such occasion, when a flow sensor, which is incapable of recognizing a flowing direction of the air, is used, the flow sensor has no other choice but to determine that the air flows in a forward direction. Accordingly, it is difficult to accurately control an air-fuel ratio of a mixture. Therefore, in recent years, a flow sensor used particularly for engine control in an automobile is designed to detect a flow quantity of air, as well as recognize whether the air flows in a forward direction or in a reverse direction.

JP-A-8-43162 discloses a thermal-type flow sensor, which is also capable of detecting a reverse direction of air. FIG. 4A shows a circuit diagram showing a circuit arrangement of a flow sensor arranged based upon the technology described in this prior art, and FIG. 4B shows heat generating resistors (Rh5 and Rh6) and thermometer (heat sensing) resistors (Rt2 and Rt3) formed on a substrate 1c in the flow sensor. As shown in FIG. 4B, the flow sensor is formed in such a way that the two heat generating resistors Rh5 and Rh6 are placed to be opposed with each other in the flow direction on the substrate 1c and the thermometer resistors Rt2 and Rt3 respectively for adjusting a temperature of each heat generating resistor are formed on the same substrate 1c.

These resistors are connected as shown in FIG. 4A. A drive circuit 100 controls a temperature of the heat generating resistor Rh5 so as to be by a predetermined value higher than the surrounding temperature thereof and a drive circuit 200 controls a temperature of the heat generating resistor Rh6 so as to be by a predetermined value higher than the surrounding temperature thereof. In order to control the temperatures of the heat generating resistors Rh5 and Rh6 so as to be the same, each of the drive circuit 100 and the drive circuit 200 is formed of an element having the same properties.

Each of the heat generating resistors Rh5 and Rh6 and the thermometer resistors Rt2 and Rt3 has resistance having temperature-dependent properties, i.e. the resistance, a resistance value of which changes with its temperature and is formed of, for example, a platinum film or a polysilicon film. Since the heat generating resistors Rh5 and Rh6 are controlled to be at high temperatures by the current flowing through themselves, the resistance value of each is made smaller than that of each thermometer resistor Rt2 and Rt3 for smoother flow of the current therethrough.

In the above arrangement, the substrate 1c on which the heat generating resistors Rh5 and Rh6 and the thermometer resistors Rt2 and Rt3 are formed is located in the air fluid so that each resistor is positioned to be perpendicular to a flow direction of air. On this occasion, one of the heat generating resistors Rh5 and Rh6 is positioned in the upstream side with respect to the flow direction of air and the other is positioned in the downstream side with respect thereto.

In addition, each of the heat generating resistors Rh5 and Rh6 is controlled by the respective drive circuits 100 and 200 operated with a power supply voltage Vb in such a way that a temperature of each is higher by a predetermined value (for example, 150° C.) than the surrounding temperature thereof.

When air flows in the forward direction under such conditions, air cools the heat generating resistor Rh5, thereby reducing a resistance value thereof. A reduction quantity of the resistance value increases in proportion to the air flow. On the other hand, the air heated by the heat generating resistor Rh5 passes through the heat generating resistor Rh6 located in the downstream side of the heat generating resistor Rh5, and therefore, it is not so much cooled. That is, the resistance value of the heat generating resistor Rh6 is not so much reduced as that of the heat generating resistor Rh5. As a result, an electric potential V10 of a terminal 70 to which one end of the heat generating resistor Rh5 is connected increases in comparison with that before the air flows therethrough. On the other hand, an electric potential V20 of a terminal 71 to which one end of the heat generating resistor Rh6 is connected does not change so much before and after the air flows therethrough.

On the contrary, when the air flows in the reverse direction, the resistance value of the heat generating resistor Rh6 reduces and the resistance value of the heat generating resistor Rh5 does not change so much. That is, the electric potential V20 in the terminal 71 increases in comparison with that before the air flows therethrough. The electric potential V10 in the terminal 70 does not change so much before and after the air flows therethrough.

Accordingly, when a difference Vo between the electric potential V10 in the terminal 70 and the electric potential V20 in the terminal 71 is monitored and as a result the difference Vo is a positive value, it is determined that the air flows in the forward direction. When the difference is a negative value, it is determined that the air flows in the reverse direction. Further, a flow speed of the air is calculated on the basis of a magnitude of the difference Vo.

In the above arrangement, the flow sensor for controlling each of the heat generating resistors Rh5 and Rh6 to be at a predetermined temperature is provided with the drive circuits 100 and 200 separately arranged. It is preferable to use the drive circuits 100 and 200, each of which is formed of an element having as much the same properties as possible for controlling temperatures of the heat generating resistors Rh5 and Rh6 in the same way. In particular, in regard to each of differential amplifiers 30 and 31, which monitors an intermediate electric potential difference of each bridge circuit, since each current value flowing in the heat generating resistors Rh5 and Rh6 is determined by each output of the differential amplifiers 30 and 31, it is preferable to use an ideal differential amplifier, an offset voltage of which is zero.

However, variations in each of the differential amplifiers occur, and therefore, it is difficult to provide the differential amplifiers, each having the exactly same properties. Accordingly, the offset voltage is in fact produced in each of the differential amplifiers 30 and 31, and also the offset voltage itself differs in magnitude therebetween. Therefore, the difference in properties between the differential amplifier 30 and the differential amplifier 31 causes an error in temperature control between the heat generating resistor Rh5 and the heat generating resistor Rh6. As a result, the sensitivity to the air flow differs between the heat generating resistor Rh5 and the heat generating resistor Rh6. That is, when the air flow is designed to be more accurately calculated, unevenness in properties between the drive circuit 100 and the drive circuit 200 causes obstruction to accurate calculation. In particular, in recent years, a flow sensor is desired more and more to detect air flow quantity with high accuracy in an internal combustion engine to meet exhaust gas emission regulations for an automobile.

SUMMARY OF THE INVENTION

The present invention has an object of providing a flow sensor capable of detecting a forward direction and also a reverse direction of air flow, used for controlling an air-fuel ratio of a mixture in an engine for an automobile or the like, which can more accurately detect a flow quantity of air than the conventional one.

In a fluid flow sensor, two heat generating resistors formed on a substrate in the upstream side with respect to an air flow direction and two other heat generating resistors are formed in the downstream side. A bridge circuit is formed of the four heat generating resistors. The two heat generating resistors in the upstream side are arranged diagonally to each other in the bridge circuit, and the two other heat generating resistors in the downstream side are arranged diagonally to each other in the bridge circuit. A temperature of the four heat generating resistors is controlled to be at a predetermined temperature. When air flows, electric potentials of the intermediate terminals in the bridge circuit change. A flow quantity and a flow direction of the air are calculated by detecting the electric potential difference of the bridge circuit.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

A flow sensor according to the first embodiment is used for detecting a flow quantity of air in an intake manifold of an engine for an automobile. The flow sensor is shown in FIGS. 1 and 2A to 2C.

Figure 2A:
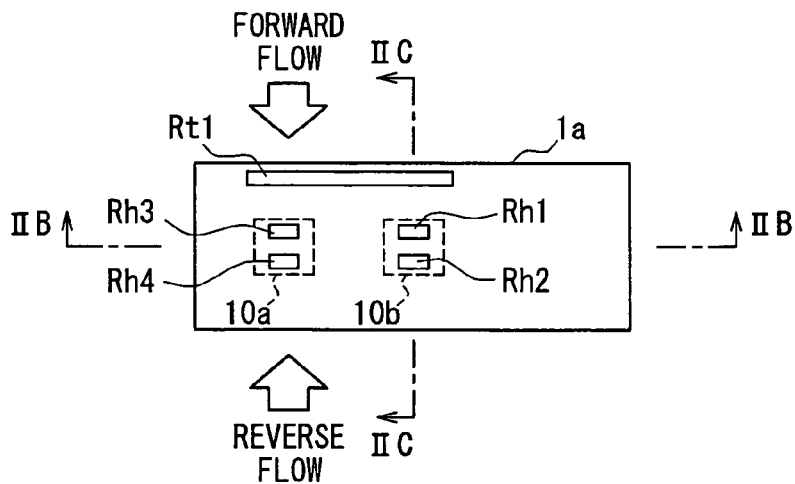
FIG. 2A is a plan view showing four heat generating resistors and a thermometer resistor formed on a substrate in the first embodiment.

In FIG. 2A, a substrate 1a is placed in an intake manifold of an engine and formed of, for example, silicon (Si). Four heat generating resistors Rh1, Rh2, Rh3 and Rh4 and one thermometer resistor Rt1 are formed on the substrate 1a. The two heat generating resistors Rh1 and Rh3 out of the four heat generating resistors Rh1 to Rh4 are positioned in the upstream side with respect to the air flow direction and the others are positioned in the downstream side with respect thereto. Any of the four heat generating resistors Rh1 to Rh4 is formed on the substrate 1a to be positioned to be perpendicular to the air flow direction in order to increase a contact area with air. Further, the heat generating resistor Rh1 is formed to be opposed to the heat generating resistor Rh2 with each other in the flow direction. The heat generating resistor Rh3 is formed to be opposed to the heat generating resistor Rh4 with each other in the flow direction. These two opposing heat generating resistors (the heat generating resistor Rh1 and the heat generating resistor Rh2, and the heat generating resistor Rh3 and the heat generating resistor Rh4) are, placed at positions as close to each other as possible so that when air flows, the air heated due to contact with one heat generating resistor passes through the other heat generating resistor before the heated air is cooled.

Figure 2C:
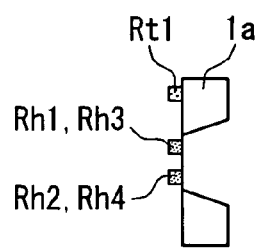
FIG. 2C is a cross-sectional view of the substrate taken on line IIC-IIC in FIG. 2A.
Figure 2B:
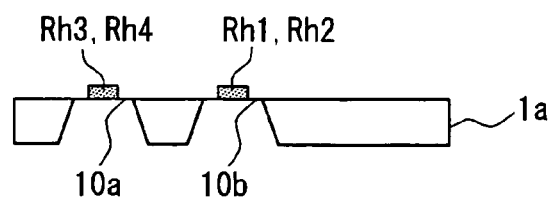
FIG. 2B is a cross-sectional view of the substrate taken on line IIB-IIB in FIG. 2A.

Each of the four heat generating resistors Rh1 to Rh4 is formed of a film resistor, which has the same shape and the same properties, and is heated at high temperatures due to the current flowing therethrough. For example, the heat generating resistors Rh1 to Rh4 are formed on the substrate 1a by vacuum deposition or sputtering of platinum (Pt) or polysilicon (Poly-Si). As shown in FIGS. 2B and 2C, the heat generating resistors Rh1 to Rh4 are provided in membranes 10a and 10b formed by etching the backside (bottom side) of the substrate 1a. As a result, thermal insulation properties of the heat generating resistors Rh1 and Rh4 from the circumference thereof are established, thus producing heat efficiently.

The thermometer resistor Rt1 is a resistor a resistance value of which changes with a surrounding temperature, and is a platinum film (Pt) or a polysilicon film (Poly-Si) formed by vacuum deposition or sputtering the same as the heat generating resistors Rh1 to Rh4. The thermometer resistor Rt1 detects a temperature in the intake manifold and the heat generating resistors Rh1 to Rh4 are, as described later, controlled to be always at a temperature higher by a predetermined value (for example, 150° C.) than a temperature in the intake manifold based upon a resistance value of the thermometer resistor Rt1. The thermometer resistor Rt1 is, as described above, formed of a material having the same properties as the heat generating resistors Rh1 to Rh4, but the thermometer resistor Rt1 is not heated at high temperatures in the same way as the heat generating resistors Rh1 to Rh4. Therefore, the resistance value thereof is designed to be greater than that of each of the heat generating resistors Rh1 to Rh4. In the preferred embodiment, the thermometer resistor Rt1 is formed at a position on the substrate 1a shown in FIG. 2A. However, the thermometer resistor Rt1 may be formed at any position on the substrate 1a as long as the thermometer resistor Rt1 can detect a temperature of the circumference of the heat generating resistors Rh1 to Rh4. However, when the thermometer resistor Rt1 is positioned excessively close to the heat generating resistors Rh1 to Rh4, the thermometer resistor Rt1 is affected by heat radiated from the heat generating resistors Rh1 to Rh4, which causes a change of the resistance value thereof. Accordingly, the thermometer resistor Rt1 is positioned in the appropriate distance from the heat generating resistors Rh1 to Rh4.

Figure 1:
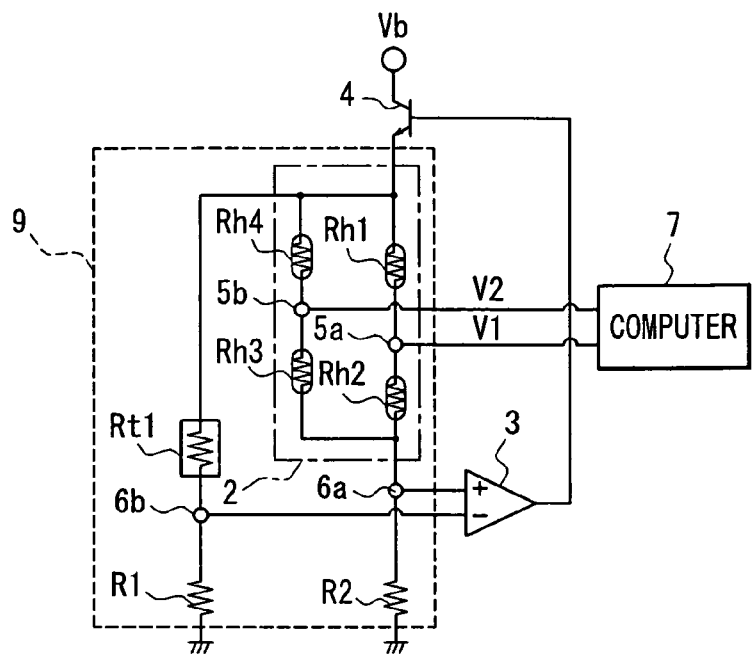
FIG. 1 is a circuit diagram showing a flow sensor in a first preferred embodiment of the present invention.

Each of the four heat generating resistors Rh1 to Rh4 and the thermometer resistor Rt1 as described above is connected electrically to electrodes (not shown) formed on the substrate 1a. The four heat generating resistors Rh1 to Rh4 and the thermometer resistor Rt1 are electrically connected at an outside of the substrate 1a as shown in FIG. 1. Among the four heat generating resistors Rh1 to Rh4, the heat generating resistor Rh1 and the heat generating resistor Rh2 are serially connected and the heat generating resistor Rh4 and the heat generating resistor Rh3 are serially connected. In addition, the serially connected heat generating resistors Rh1 and Rh2 are connected in parallel with the serially connected heat generating resistors Rh4 and Rh3 to form a bridge circuit 2. The heat generating resistors Rh1 and Rh3 form bridge arms which are diagonal to each other, and the heat generating resistors Rh2 and Rh4 also form bridge arms which are diagonal to each other.

The bridge circuit 2 has one end connected to a power supply voltage Vb via a transistor 4 and the other end connected to the ground via a resistor R2. The thermometer resistor Rt1 has one end connected to the ground via a resistor R1 and the other end connected to the power voltage Vb via the transistor 4 the same as the bridge circuit 2. That is, a bridge circuit 9 is formed of the bridge circuit 2, the thermometer resistor Rt1, the resistor R1 and the resistor R2. The current flowing in the bridge circuit 9 is controlled so that the bridge circuit 9 is balanced, i.e. the electric potential difference between the intermediate terminals 5a and 5b is zero. Values of the resistors R1 and R2 are set so that when the bridge circuit 9 are balanced, a temperature of each of the heat generating resistors Rh1 to Rh4 becomes a predetermined value (for example, 150° C. higher than the temperature in the intake manifold).

As shown in FIG. 1, a differential amplifier 3 includes a non-inverting input terminal and an inverting input terminal, and outputs to an output terminal a signal in proportion to a difference between signals inputted to the two input terminals. A connection terminal 6a between the bridge circuit 2 and the resistor R2 is connected to the non-inverting input terminal of the differential amplifier 3, and a connection terminal 6b between the thermometer resistor Rt1 and the resistor R1 is connected to the inverting input terminal of the differential amplifier 3. The output terminal of the differential amplifier 3 is connected to a base terminal of a transistor 4.

The collector terminal of the transistor 4 is connected to the power supply voltage Vb and the emitter terminal thereof is connected to the bridge circuit 2 and the thermometer resistor Rt1. The transistor 4 operates to increase/decrease the current flowing through the bridge circuit 9 formed of the bridge circuit 2, the thermometer resistor Rt1, the resistors R1 and the resistor R2. That is, the transistor 4 controls the current supplied from the power supply voltage Vb to the bridge circuit 9, based upon a signal from the differential amplifier 3.

Further, a computer 7 is connected to the two intermediate terminals 5a and 5b of the bridge circuit 2. The computer 7 detects an electric potential difference between the intermediate terminals 5a and 5b and calculates a flow quantity and a flow direction of air based upon the electric potential difference.

According to the first embodiment, the substrate 1a, on which the heat generating resistors Rh1 to Rh4 and the thermometer resistor Rt1 are formed, is located in the intake manifold so that each resistor is positioned to be perpendicular to the flow direction of air. On such occasion, the thermometer resistor Rt1 has a resistance value which corresponds to a temperature in the intake manifold. The current flowing in the bridge circuit 9 is controlled by the differential amplifier 3 and the transistor 4 so that the electric potential difference between the terminal 6a and the terminal 6b is zero. Thereby, the temperature of each of the four heat generating resistors Rh1 to Rh4 is higher by a predetermined value (for example, 150° C.) than the temperature in the intake manifold. Each of the four heat generating resistors Rh1 to Rh4 has the same properties and therefore, the voltages in both ends of each heat generating resistor are equal. That is, the bridge circuit 2 is in a balanced condition.

Under such a condition, when air flows in the forward direction, the heat generating resistors Rh1 and Rh3 positioned in the upstream side out of the four heat generating resistors Rh1 to Rh4 firstly get in contact with air (FIG. 2A). Therefore, this air is to take out heat from the heat generating resistors Rh1 and Rh3, thus reducing the resistance values thereof. At this time, as the air flow increases, more heat is taken out from the heat generating resistors Rh1 and Rh3, a reduction quantity of the resistance value increases in proportion to the air flow. On the other hand, since the air heated by the heat generating resistors Rh1 to Rh3 is to get in contact with the heat generating resistors Rh2 and Rh4 positioned in the downstream side of the heat generating resistors Rh1 to Rh3, the resistance value of each of the heat generating resistors Rh2 and Rh4 does not nearly change before and after the air flows. As a result, a difference in voltage between both ends of each of the heat generating resistors Rh1 to Rh4 occurs. That is, when the voltages in both ends of the heat generating resistor Rh1 are compared with the voltages in both ends of the heat generating resistor Rh2 connected serially to the heat generating resistor Rh1, the voltages in both ends of the heat generating resistor Rh1 are smaller.

Similarly, in regard to the heat generating resistor Rh3 and the heat generating resistor Rh4, the voltages in both ends of the heat generating resistor Rh3 are smaller. Therefore, electric potentials V1 and V2 of two intermediate terminals 5a and 5b in the bridge circuit 2 are compared, the electric potential V1 of the terminal 5a is greater than the electric potential V2 of the terminal 5b. That is, the electric potential difference Vo (V1-V2) having some magnitude is made between the two intermediate terminals 5a and 5b in the bridge circuit 2 and the computer 7 calculates an air flow based upon a magnitude of the electric potential difference Vo.

On the other hand, when the air flows in the reverse direction, since this time, the heat generating resistors Rh2 and Rh4 positioned in the downstream side firstly get in contact with air, the resistance value of each of the heat generating resistors Rh2 and Rh4 is reduced. The air heated by the heat generating resistors Rh2 to Rh4 is to get in contact with the heat generating resistors Rh1 and Rh3 positioned in the upstream side, and therefore, the resistance value of each of the heat generating resistors Rh1 and Rh3 does not nearly change before and after the air flows. Therefore, when electric potentials V1 and V2 of two intermediate terminals 5a and 5b in the bridge circuit 2 are compared, the electric potential V1 of the terminal 5a is smaller than the electric potential V2 of the terminal 5b, as opposite to the forward flow direction of air. Accordingly, the electric potential difference Vo (V1-V2) with a sign opposite to that in the forward flow direction is made between the two intermediate terminals 5a and 5b in the bridge circuit 2. Similarly to the forward flow direction, the computer 7 calculates an air flow based upon a magnitude of the electric potential difference Vo and also can recognize that the air flows in the reverse direction based upon the sign of the electric potential difference.

As described above, the flow sensor in the first embodiment is provided with the bridge circuit 2 formed of four heat generating resistors Rh1 to Rh4 (refer to FIG. 1). When the air does not flow, since the resistance values of the four heat generating resistors Rh1 to Rh4 are the same, the bridge circuit 2 is maintained to be balanced. On the other hand, when the air flows, a difference in the resistance value between the heat generating resistors Rh1 and Rh3 in the upstream side and the corresponding heat generating resistors RH2 and Rh4 in the downstream side occurs, so that the bridge circuit 2 is in a non-balanced condition. That is, the electric potential difference Vo (V1-V2) is made between the two intermediate terminals 5a and 5b in the bridge circuit 2. A flow quantity and a flow direction of air can be calculated based upon the electric potential difference Vo (V1-V2). Thereby, the air flow can be calculated with higher sensitivity than the conventional flow sensor.

Further, a temperature of each of the heat generating resistors Rh1 to Rh4 is controlled to be at a value higher by a predetermined temperature (for example, 150° C.) than a temperature in the intake manifold by the differential amplifier 3 and the transistor 4, based upon a resistance value of the thermometer resistor Rt1 as a reference. In this way, the temperature of each of the heat generating resistors Rh1 to Rh4 is controlled by an independent control circuit, and therefore, the temperature of each of the heat generating resistors Rh1 to Rh4 is equally controlled. As a result, since the conventional problem with unevenness between a plurality of drive circuits is solved, detection accuracy of an air flow can be improved. Further, the number of circuit elements such as a differential amplifier can be reduced, thus achieving the cost reduction.

Figure 3A:
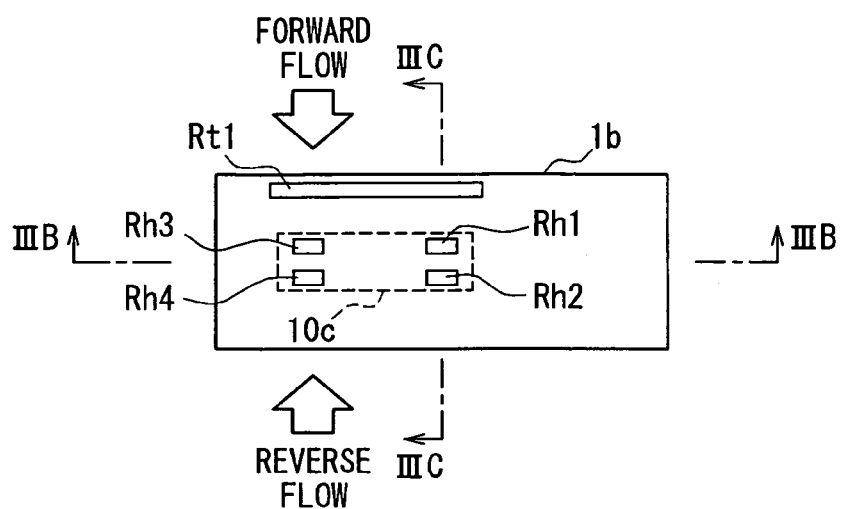
FIG. 3A is a plan view showing four heat generating resistors formed in one membrane in a second preferred embodiment of the present invention.
Figure 3C:
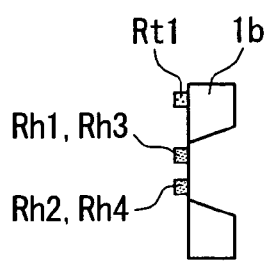
FIG. 3C is a cross-sectional view of the substrate taken on line IIIC-IIIC in FIG. 3A.
Figure 3B:
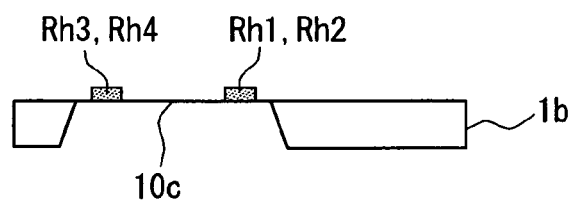
FIG. 3B is a cross-sectional view of the substrate taken on line IIIB-IIIB in FIG. 3A.
Figure 4A:
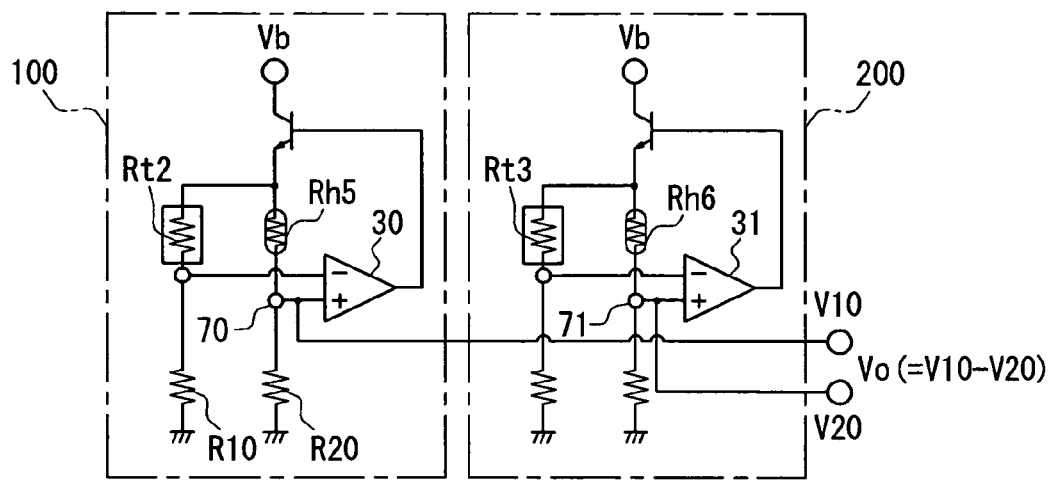
FIG. 4A is a circuit diagram showing a conventional flow sensor.
Figure 4B:
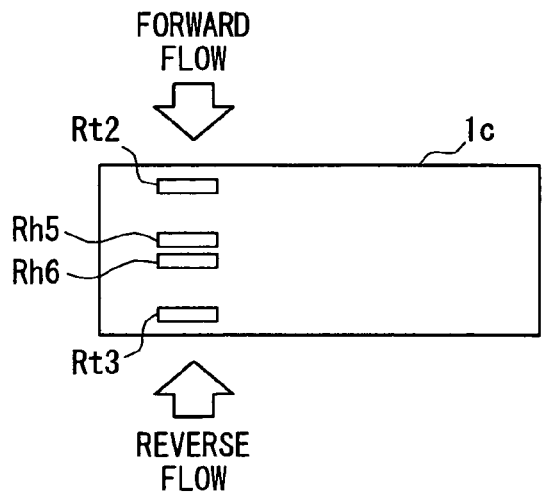
FIG. 4B is a plan view showing two heat generating resistors and two thermometer resistors formed on a substrate in the conventional flow sensor.

In the first embodiment, two membranes 10a and 10b are formed to the two opposing heat generating resistors (heat generating resistors Rh1 and Rh2 or heat generating resistors Rh3 and Rh4), respectively, as shown in FIGS. 2A to 2C. However, the number of heat generating resistors formed in one membrane may be changed. For example, as shown in the second preferred embodiment shown in FIGS. 3A-3C, the four heat generating resistors Rh1 to Rh4 may be formed in one membrane 10c.

What is claimed is:

1. A flow sensor, comprising:

a substrate located in a gas fluid;

a heat generating resistance portion including a first heat generating resistor, a second heat generating resistor, a third heat generating resistor and a fourth heat generating resistor formed on the substrate, each of the four resistors having same properties and a resistance value changing with a temperature thereof, wherein the first and the third heat generating resistors are formed in an upstream side with respect to a flow direction of the gas fluid, and the second and the fourth heat generating resistors are formed in the downstream side with respect to the flow direction of the gas fluid;

a first bridge circuit including the first to the fourth heat generating resistors, wherein the first and the second heat generating resistors are serially connected and the third and the fourth heat generating resistors are serially connected and wherein the two serial circuits of the heat generating resistors are connected in parallel so that the first and the fourth heat generating resistors are positioned in a first side of a power supply source and the second and the third heat generating resistors are positioned in a second side of the power supply source;

a second bridge circuit including:

a thermometer resistor a resistance value of which changes with a surrounding temperature thereof; and a first resistor and a second resistor, each having a predetermined resistance value, wherein the second bridge circuit is formed of the first bridge circuit, the thermometer resistor, the first resistor and the second resistor, and wherein a resistance value of each of the first and the second resistor is adjusted so that when the second bridge circuit is balanced, a temperature of each of the first to the fourth heat generating resistor is higher by a predetermined value than a temperature in the gas fluid;

a current adjusting section for monitoring an electric potential difference between two intermediate terminals in the second bridge circuit to adjust the current flowing in the second bridge circuit based upon the electric potential difference so that the second bridge circuit is balanced; and a computer section connected to two intermediate terminals in the first bridge circuit for calculating a flow quantity and a flow direction of the gas fluid based upon an electric potential difference between the two intermediate terminals.

2. The flow sensor according to claim 1, wherein:

the thermometer resistor is formed on the substrate.

3. The flow sensor according to claim 2, wherein:

the thermometer resistor if formed at a more upstream position than the first and the third heat generating resistors with respect to the flow direction of the gas fluid.

4. The flow sensor according to claim 1, wherein:

each of the four heat generating resistors is formed by placing the same heat generating resistance material in the same shape on the substrate.

5. The flow sensor according to claim 1, wherein:

the substrate has a first membrane part and a second membrane part;

the first and the second heat generating resistors are formed on the first membrane part, and the third and the fourth heat generating resistors are formed on the second membrane part; and the thermometer resistor is formed outside the membranes.

6. The flow sensor according to claim 1, wherein:
the substrate has a single membrane;
the first, second, the third and the fourth heat generating resistances are formed in the single membrane; and
the thermometer resistor is formed outside the membrane.

7. A flow sensor, comprising:
a substrate located in a gas fluid;
a bridge circuit including a first heat generating resistor, a second heat generating resistor, a third heat generating resistor and a fourth heat generating resistor formed on the substrate, each of the four resistors having same properties and a resistance value changing with a temperature thereof,
wherein the first and the second heat generating resistors are serially connected to produce a first signal from a first connection point therebetween, and the third and the fourth heat generating resistors are serially connected to produce a second signal from a second connection point therebetween,
wherein the first and the third heat generating resistors are formed in an upstream side with respect to a flow direction of the gas fluid,
wherein the second and the fourth heat generating resistors are formed in the downstream side with respect to the flow direction of the gas fluid,
wherein the first and the third heat generating resistors are arranged in a diagonal relation to each other in the bridge circuit, and the second and the fourth heat generating resistors are arranged in a diagonal relation to each other in the bridge circuit; and
a computer connected to the first and the second connection points to determine amount and direction of flow of the gas fluid based on a difference between the first and the second signals.

* * * * *